(12) United States Patent
Xie et al.

(10) Patent No.: US 10,762,607 B2
(45) Date of Patent: Sep. 1, 2020

(54) METHOD AND DEVICE FOR SENSITIVE DATA MASKING BASED ON IMAGE RECOGNITION

(71) Applicant: ALIBABA GROUP HOLDING LIMITED, Grand Cayman (KY)

(72) Inventors: Fuheng Xie, Hangzhou (CN); Kun Lian, Hangzhou (CN); Qingcheng Wei, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/820,535

(22) Filed: Mar. 16, 2020

(65) Prior Publication Data

US 2020/0219235 A1 Jul. 9, 2020

Related U.S. Application Data

(63) Continuation of application No. PCT/CN2020/070984, filed on Jan. 8, 2020.

(30) Foreign Application Priority Data

Apr. 10, 2019 (CN) .......................... 2019 1 0286610

(51) Int. Cl.
*G06K 9/40* (2006.01)
*G06T 5/00* (2006.01)
(Continued)

(52) U.S. Cl.
CPC ............ *G06T 5/004* (2013.01); *G06K 9/4604* (2013.01); *G06K 9/6256* (2013.01); *G06T 2207/20081* (2013.01); *G06T 2207/20132* (2013.01)

(58) Field of Classification Search
CPC ..... G01S 19/14; G01S 19/21; H04K 2203/16; H04K 3/228; H04K 3/41; H04K 3/42;
(Continued)

(56) References Cited

U.S. PATENT DOCUMENTS 7,062,073 B1 6/2006 Tumey et al.
7,203,346 B2 4/2007 Kim et al.
(Continued)

FOREIGN PATENT DOCUMENTS

CN 103679132 A 3/2014
CN 104008174 A 8/2014
(Continued)

OTHER PUBLICATIONS

First Search dated Apr. 1, 2020, issued in related Chinese Patent Application No. 201910286610.5 (2 pages).
(Continued)

*Primary Examiner* — Xin Jia
(74) *Attorney, Agent, or Firm* — Sheppard Mullin Richter & Hampton LLP

(57) ABSTRACT

A method for masking sensitive data based on image recognition comprises: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; masking the sensitive data for the sensitive features of the to-be-processed image. The method for masking sensitive data based on image recognition realizes the sensitive data masking for images based on image recognition, and the efficiency of sensitive data masking is relatively high.

18 Claims, 7 Drawing Sheets

(51) Int. Cl.
*G06K 9/46* (2006.01)
*G06K 9/62* (2006.01)

(58) Field of Classification Search
CPC .......... H04K 3/84; H04K 3/90; H04L 5/0048; H04L 5/14; H04W 4/06; H04W 72/0453
See application file for complete search history.

(56) References Cited

U.S. PATENT DOCUMENTS

| | | | |
|---|---|---|---|
| 7,714,878 B2 | 5/2010 | Gabay et al. | |
| 8,098,904 B2 | 1/2012 | Ioffe et al. | |
| 8,160,307 B2 | 4/2012 | Polcha et al. | |
| 8,224,042 B2 | 7/2012 | Wang | |
| 8,559,708 B2 | 10/2013 | Free | |
| 9,552,511 B2 | 1/2017 | Yagnik | |
| 10,320,807 B2 | 6/2019 | Khan | |
| 2013/0339386 A1* | 12/2013 | Serrano | G06F 16/24526 707/770 |
| 2014/0023248 A1 | 1/2014 | Yoo et al. | |
| 2014/0140575 A1 | 5/2014 | Wolf | |
| 2016/0196467 A1* | 7/2016 | Xia | G06K 9/00281 382/118 |
| 2016/0300252 A1* | 10/2016 | Frank | G06F 16/24578 |
| 2018/0052971 A1* | 2/2018 | Hanina | A61B 5/68 |
| 2018/0349729 A1* | 12/2018 | Mandal | G06K 9/6232 |
| 2019/0080155 A1 | 3/2019 | Ganong et al. | |

FOREIGN PATENT DOCUMENTS

| | | |
|---|---|---|
| CN | 106933816 A | 7/2017 |
| CN | 107239666 A | 10/2017 |
| CN | 107704877 A | 2/2018 |

OTHER PUBLICATIONS

First Office Action dated Apr. 9, 2020, issued in related Chinese Patent Application No. 201910286610.5, with English machine translation (19 pages).

* cited by examiner

METHOD AND DEVICE FOR SENSITIVE DATA MASKING BASED ON IMAGE RECOGNITION

CROSS-REFERENCE TO RELATED APPLICATIONS

This application is a continuation application of International Patent Application No. PCT/CN2020/070984, filed on Jan. 8, 2020, which claims priority to and benefits of the Chinese Patent Application No. 201910286610.5, filed on Apr. 10, 2019. The contents of the above-referenced applications are incorporated herein by reference in their entirety.

TECHNICAL FIELD

This specification relates to the field of image processing technology, and in particular, to a method and device for sensitive data masking based on image recognition.

BACKGROUND

In the era of big data, the commercial value contained in data has been fully explored, and the accurate positioning of users has been realized on the basis of data investigating, providing users with more targeted marketing recommendation strategies and service strategies. However, it also brings a huge challenge on the protection of user privacy—how to protect users' privacy while conducting data investigating will become the most serious issue in sensitive data masking. Sensitive data masking refers to a process of data deforming for certain sensitive information according to the sensitive data masking rules, realizing a reliable protection of sensitive private data, and the safe use of the real data set, when in an environment of development, testing and other non-production and outsourcing environments.

At present, the sensitive data masking for text information is mainly to recognize the text contents through natural language processing, and then to perform sensitive data masking for users' private information, such as names, IDs, cell-phone numbers and bank account numbers, on the basis of the recognized text contents. However, the current method of sensitive data masking can only process the texts when processing images, in which, it, at first, recognizes texts in images, and then it identifies sensitive information from the recognized texts, and finally sensitive data is masked for the sensitive information contained in the images. However, for those images with few texts or containing some texts difficult to be recognized, it is hard to mask sensitive data based on image processing, resulting in a greater defect in the sensitive data masking.

SUMMARY OF THE INVENTION

Accordingly, embodiments of this specification provide a method for masking sensitive data based on image recognition, to fix the technical defects existing in the prior art. Embodiments of this specification provide a device for masking sensitive data based on image recognition, a model training method and device, two computing devices, and two computer readable storage media.

The present specification provides a method for masking sensitive data based on image recognition, comprising: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking the sensitive features of the to-be-processed image.

In some embodiments, the at least one dimension of sensitive data masking comprise at least one of: a dimension of image color, a dimension of image feature position, and a dimension of image feature identifier.

In some embodiments, the extracting initial image features of a to-be-processed image in multiple dimensions of features comprises: extracting feature vectors corresponding to the initial image features of the to-be-processed image in the multiple dimensions of features; and a numerical value of vector dimensions of the feature vectors is equal to a numerical value of the multiple dimensions of features.

In some embodiments, the reducing dimensions for the initial image features in the multiple dimensions of features to obtain image features of the to-be-processed image in at least one dimension of sensitive data masking comprises: performing a dimension-reduction calculation to obtain the feature vectors of the to-be-processed image in the at least one dimension of sensitive data masking.

In some embodiments, the method, after the extracting initial image features of a to-be-processed image in multiple dimensions of features, and before the reducing dimensions for the initial image features in the multiple dimensions of features to obtain image features of the to-be-processed image in at least one dimension of sensitive data masking, further comprises: preprocessing the to-be-processed image based on the initial image features in the multiple dimensions of features.

In some embodiments, if the multiple dimensions of features include a dimension of image feature position, the preprocessing the to-be-processed image based on the initial image features in the multiple dimensions of features comprises: determining, according to the initial image features in the dimension of image feature position, position information of the image features of the to-be-processed image; and cropping the to-be-processed image based on the position information of the image features of the to-be-processed image.

In some embodiments, the method, before the extracting initial image features of a to-be-processed image in multiple dimensions of features, further comprises: acquiring the to-be-processed image included in materials of a project submitted by a project member during project participation.

In some embodiments, the reducing dimensions for the initial image features in the multiple dimensions of features to obtain image features of the to-be-processed image in at least one dimension of sensitive data masking comprises: obtaining, by training, a dimension-reduction model of image features, and inputting, into the trained dimension-reduction model of image features, the initial image features of the to-be-processed image in the multiple dimensions of the features to perform features dimension reduction, and to output the image features of the to-be-processed image in the at least one dimension of sensitive data masking.

In some embodiments, the obtaining, by training, a dimension-reduction model of image features comprises: acquiring an initial image set including initial images on which sensitive data is masked; extracting, from the initial image set, initial image features of the initial images of the initial image set in the multiple dimensions of features; reducing dimensions for the initial image features in the multiple dimensions of features, to obtain real image features of the initial images in the at least one dimension of sensitive data masking; and training, with first training samples including the initial image features in the multiple dimensions of the features and the real image features in the at least one dimension of sensitive data masking, a pre-built dimension-reduction model of the initial image features to obtain the dimension-reduction model of the image features.

In some embodiments, the identifying sensitive features of the to-be-processed image based on the image features in the at least one dimension of sensitive data masking comprises: obtaining, by training, an image recognition model, and inputting, into the trained image recognition model, the to-be-processed image having the image features in the at least one dimension of sensitive data masking to identify the sensitive features, and to output the sensitive features of the to-be-processed image.

In some embodiments, the obtaining, by training, an image recognition model comprises: training a pre-built initial image recognition model with second training samples including the initial images having the real image features in the at least one dimension of sensitive data masking and the initial images having the real sensitive features to obtain the image recognition model.

The present specification also provides a device for masking sensitive data based on image recognition, comprising: a processor; a memory, configured to store computer executable instructions, which, when executed, cause the processor to perform operations comprising: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking the sensitive features of the to-be-processed image.

The operations further comprise: acquiring an initial image set including initial images on which sensitive data is masked; extracting, from the initial image set, initial image features of the initial images of the initial image set in multiple dimensions of features; reducing dimensions for the initial image features in the multiple dimensions of features, to obtain real image features of the initial image in at least one dimension of sensitive data masking; training a pre-built dimension-reduction model of image features with first training samples including the initial image features in the multiple dimensions of features and the real image features in the at least one dimension of sensitive data masking; training a pre-built image recognition model with second training sample including the initial image having the real image features in the at least one dimension of sensitive data masking and the initial image having real sensitive features.

This specification also provides a non-transitory computer-readable storage medium configured with instructions executable by one or more processors to cause the one or more processors to perform operations comprising: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking for the sensitive features of the to-be-processed image.

The embodiments of the specification has at least the following advantages: the present specification provides a method for masking sensitive data based on image recognition, the method comprising: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking the sensitive features of the to-be-processed image.

The method for sensitive data masking based on image recognition provided in this specification starts from the image recognition, the first is to extract initial image features of a to-be-processed image, and on this basis the next is to reduce dimensions for the extracted initial image features of the to-be-processed image to reduce the amount of data processing during the sensitive data masking for the to-be-processed image and to improve the processing efficiency, then on the basis of dimension reduction, sensitive data is masked for the to-be-processed image based on sensitive features recognized in the to-be-processed image, so as to realize sensitive data masking based on image recognition, meanwhile the efficiency for sensitive data masking is relatively higher.

DETAILED DESCRIPTION OF EMBODIMENTS

In order to fully understand this specification, many details are set forth in the description below. However, this specification can be implemented in many other ways other than those described herein, and technical personnel in this field may make similar promotions without violating the meaning of this specification. Therefore, this specification is not subject to the specific implementation restrictions disclosed below.

The terms used in one or more embodiments of this specification are used solely for the purpose of describing a particular embodiment and are not intended to limit one or more embodiments in this specification. The singular form words "a", "the" and "this" used in one or more embodiments and appended claims of this specification are also intended to include the plural forms unless the context clearly indicates otherwise. The term "and/or" used in one or more embodiments of this specification refer to and contain any or all combinations of one or more associated items listed.

Although such terms as "first" and "second" may be used in one or more embodiments of this specification for various descriptions of information, such information shall not be limited to such terms. These terms are only used to distinguish the same type of information from each other. For example, without going beyond the scope of one or more embodiments of this specification, the "first" may also be referred to as the "second", and similarly, the "second" may also be referred to as the "first". Depending on the context, words such as "if" used herein can be interpreted as "at the time that" or "when" or "in response to determinations".

This specification provides a method for sensitive data masking based on image recognition, and also provides a device for sensitive data masking based on image recognition, a model training method and device, two computing devices, and two computer readable storage media. The following are described in detail one by one in combination with the attached drawings of the embodiments provided in this specification, and the steps of the method are described.

Figure 1:
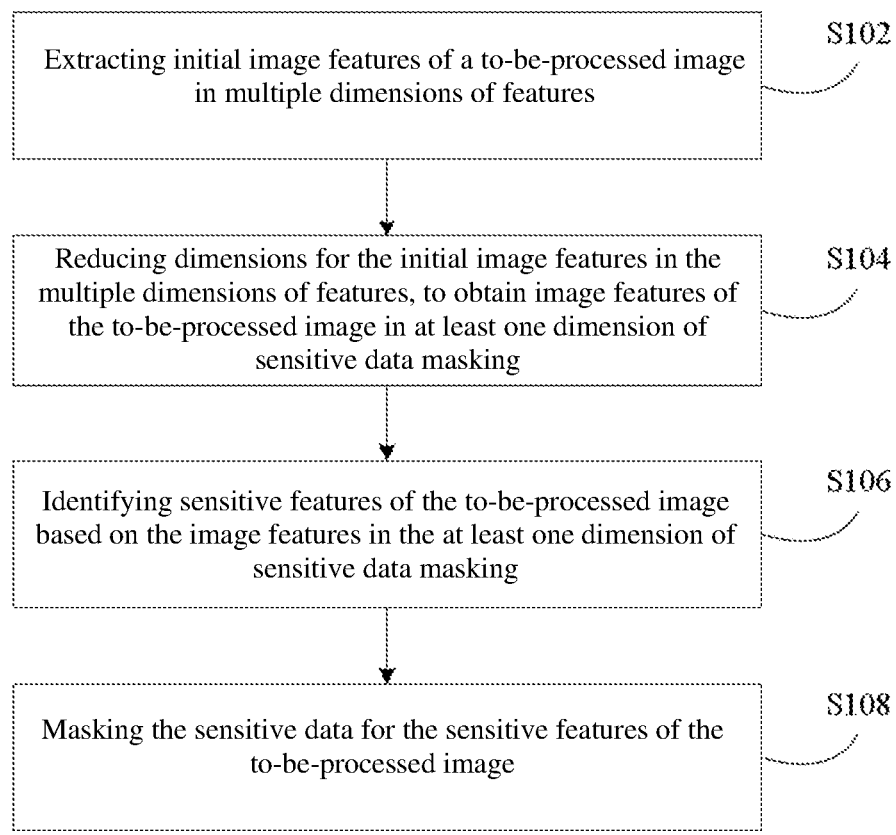
FIG. 1 is a flow chart for a method for masking sensitive data based on image recognition provided in embodiments of this specification.
Figure 2:
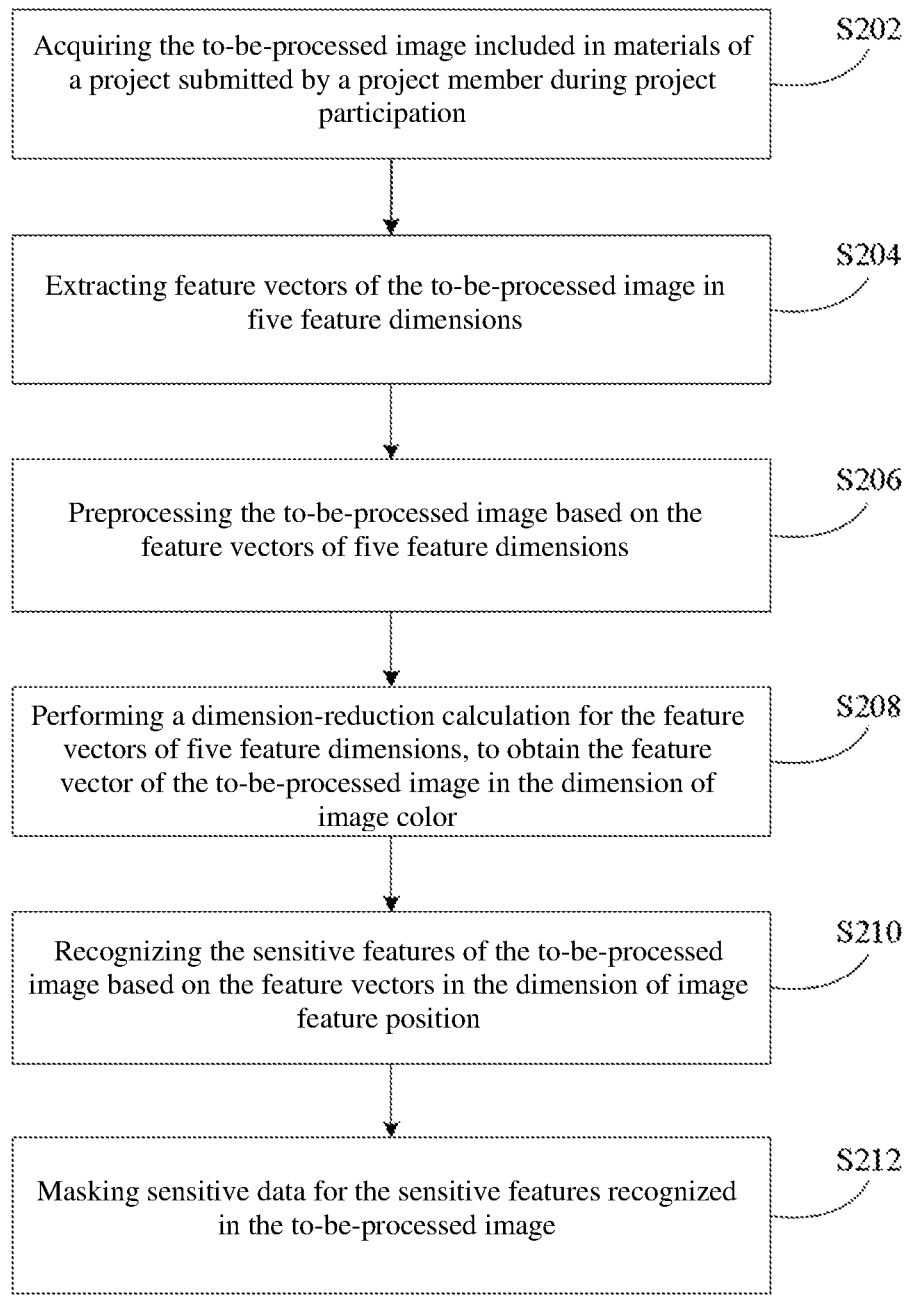
FIG. 2 is a flow chart for a method for masking sensitive data based on image recognition applied to insurance field and provided in embodiments of this specification.

Embodiments of a method for sensitive data masking based on image recognition provided by this specification are as follows:

FIG. 1 shows the flow chart of a method for sensitive data masking based on image recognition provided in embodiments of this specification; FIG. 2 shows the flow chart for a method for sensitive data masking based on image recognition applied to insurance field and provided in embodiments of this specification.

In step S102, the method may include extracting initial image features of a to-be-processed image in multiple dimensions of features.

In a practical application, there are various dimensions for image description and measurement, for example, features description and measurement can be carried out around the colors of the to-be-processed image in the dimension of image color, and features description and measurement can also be carried out for the texts or image feature identifiers in the to-be-processed image in the dimension of image contained texts or the dimension of image feature identifiers, or features description and measurement can be carried out around the texture of the to-be-processed image in the dimension of image texture, or features description and measurement can be carried out around the image feature position or the image feature spatial relationship of the to-be-processed image in the dimension of image feature position or in the dimension of image feature spatial relationship, the above dimensions for use in features description and measurement of the to-be-processed image can be used as the feature dimensions of the to-be-processed image. In addition, features description and measurement can also be carried out for the to-be-processed image in other dimensions that can describe image features, such as the grayscale dimension of pixels in the image, which can also be used as the feature dimension of the to-be-processed image but is not defined here.

In embodiments of this specification, the process of extracting the initial image features of a to-be-processed image in multiple dimensions of features is specifically to extract the initial image features of the to-be-processed image in the following five dimensions: dimension of image colors, dimension of image texture, dimension of image feature identifiers, dimension of image feature position and dimension of image feature spatial relationship.

The method for masking sensitive data based on image recognition provided in this specification is applied to sensitive data masking for the to-be-processed image in a project; before the sensitive data masking for the to-be-processed image in the project, it is preferred to acquire the to-be-processed image in materials of the project submitted by a project member during the project participation, then the operation of extracting the initial image features of the to-be-processed image in multiple dimensions of features is performed on the basis that the to-be-processed image is acquired, and subsequently the operation of masking sensitive data for the to-be-processed image is performed based on image recognition, to ensure that the sensitive or private information of project members participating in the project will not be disclosed. In addition, the method for sensitive data masking based on image recognition provided in this specification can also be applied to other scenarios, and the corresponding description provided in this embodiment can be referred for the specific realization process of other scenarios, which will not be further described here.

The project can be an insurance project, a crowdfunding project or an investment project and the like, users participating the project are called as project members; correspondingly, the project submitted by the project member during the project participation can be a claims case submitted by the project members after they have participated in the insurance project, the materials of the claims case inevitably contain images of the project member's own privacy-related information, such as the project member's front and back images of ID card, any photo of the project member, and any image containing the project member's bank account number and cell-phone number, all these images containing the project member's privacy-related information are required to receive sensitive data masking.

The method for masking sensitive data based on image recognition provided in this specification is used for masking sensitive data for the sensitive and private information in the to-be-processed image based on image recognition; in the process of masking sensitive data for the to-be-processed image, the first is to extract the initial image features of a to-be-processed image. In a preferred mode provided in the embodiments of this specification, extracting the initial image features of the to-be-processed image in multiple dimensions of features is realized by extracting feature vectors corresponding to the initial image features of the to-be-processed image in multiple dimensions of features; the vector dimension of the feature vectors extracted from the to-be-processed image is consistent to the multiple dimensions of features of the initial image features of the to-be-processed image. This is not only reflected in the fact that a numerical value of vector dimension of the feature vectors is equal to a numerical value of the multiple dimensions of features, but also in that the vector dimension of the feature vectors is the same with the multiple dimensions of features of the to-be-processed image.

For example, for project member A participating an insurance project, a claims case will be generated correspondingly after the project member A claims, and materials of claims case are in form of images, which include: project member A's front and back images of ID card, any photo of the project member A, and any image containing the project member A's bank account number and cell-phone number; these images in the claim materials include the private information of the project member A, and thus sensitive data masking is required to be performed for the images; in the specific process, the feature vectors in the following five dimensions may be extracted for each image: dimension of image colors, dimension of image texture, dimension of image feature identifiers, dimension of image feature position and dimension of image feature spatial relationship.

In particular, the representative value of the feature vectors in the dimension of image colors represents color features of the image, the representative value of the feature vectors in the dimension of image texture represents arrangement properties of partial areas that change slowly or periodically in the image, the representative value of the feature vectors in the dimension of image feature identifiers represents feature identifiers of feature blocks in the image, the representative value of the feature vectors in the dimension of image feature position represents position information of feature blocks in the image, and the representative value of the feature vectors in the dimension of image feature spatial relationship represents a distance relationship, a hierarchy relationship or an overlap relationship among the feature blocks in the image.

In one embodiment, after the initial image features of the to-be-processed image in multiple dimensions of features are extracted, a further process can be done based on the initial image features in multiple dimensions of features. After the initial image features of the to-be-processed image in multiple dimensions of features are extracted, the to-be-processed image is preprocessed based on the extracted initial image features in the multiple dimensions of features.

By taking the above dimension of image feature position as an example, the to-be-processed image is preprocessed based on the dimension of image feature position. The first step is to determine position information of the image features in the to-be-processed image according to the initial image features in the dimension of image feature position; the second step is to crop the to-be-processed image based on the position information of the image features of the to-be-processed image, to reduce the amount of data processing during the subsequent sensitive features recognition for the to-be-processed image, and to improve the processing efficiency.

Similarly, in addition to the above cropping of the to-be-processed image, other implementations of preprocessing the to-be-processed image, such as cropping and organizing the to-be-processed image on the basis that the to-be-processed image is cropped, can also reduce the amount of data processing during the subsequent sensitive features recognition for the to-be-processed image, and improve the processing efficiency, or the processing efficiency for the subsequent process of masking sensitive data for the to-be-processed image.

In step S104, the method may include reducing dimensions for the initial image features in the multiple dimensions of features, to obtain image features of the to-be-processed image in at least one dimension of sensitive data masking.

In specific implementation, after the initial image features of the to-be-processed image in the multiple dimensions of features are extracted, since the extracted initial image features of the to-be-processed image covers multiple feature dimensions, correspondingly, the subsequent sensitive data masking for the to-be-processed image is also required to performed based on multiple feature dimensions, thus it is difficult to process; in order to reduce the amount of data processing during the subsequent sensitive data masking for the to-be-processed image and to improve the processing efficiency, a dimension reduction is performed for the initial image features of the to-be-processed image in the multiple dimensions of features to reduce the complexity of subsequent sensitive data masking for the to-be-processed image; during this process, the dimension after the feature dimensions of the to-be-processed image are reduced is called as a dimension of sensitive data masking, and the dimension of sensitive data masking after the dimension reduction is done is the dimension in which the subsequent sensitive data is masked for the to-be-processed image.

The dimension of sensitive data masking can be one or more of the above five dimensions: dimension of image colors, dimension of image texture, dimension of image feature identifiers, dimension of image feature position and dimension of image feature spatial relationship, but is not defined here.

In specific implementation, to improve the efficiency of the sensitive data masking for the to-be-processed image, the amount of the dimensions of sensitive data masking is certainly less than the amount of the multiple dimensions of features, and therefore, it is necessary to determine which one or which of the above five feature dimensions are used as the dimensions of sensitive data masking. Specifically, the dimensions of sensitive data masking can also be determined according to the own features of the to-be-processed image. After the feature vector of each to-be-processed image is extracted from the five feature dimensions, the dimensions of sensitive data masking are determined according to the relatively more important features of each to-be-processed image. For example, if the color of image 1 is more obvious, the average representative value of feature vectors of the image 1 of the dimension of image colors is greater than other four dimensions after the representative values of feature vectors of the image 1 in the five dimensions are normalized, and thus the dimension of image colors is used as the dimension of subsequent sensitive data masking for the image 1. Similarly, if image 2 includes more image feature identifiers, the average representative value of feature vectors of the image 2 of the dimension of image feature identifier is greater than other four dimensions after the representative values of feature vectors of the image 2 in the five dimensions are normalized, and thus the dimension of image feature identifiers is used as the dimension of subsequent sensitive data masking for the image 2.

On the basis that the feature vectors corresponding to the initial image features of the to-be-processed image in the multiple dimensions of features are extracted in a preferred mode, in the preferred mode provided in the embodiments of this specification, reducing dimensions for the initial image features of the to-be-processed image in the multiple dimensions of features specifically refers to a dimension-reduction calculation being performed to the feature vectors, after which the feature vectors of the to-be-processed image in the dimension of sensitive data masking is obtained.

For example, based on the feature vectors of each image in the materials of the project member A in the five dimensions: dimension of image colors, dimension of image texture, dimension of image feature identifiers, dimension of image feature position and dimension of image feature spatial relationship, a principal component analysis (PCA) algorithm is used to calculate the feature vectors of each image in the five dimensions; by taking n pieces of five-dimension data as an example, firstly the data is formed into a matrix X of n rows and 5 columns, and then each row of X is null-averaged, that is, the mean of this row is subtracted to find the covariance matrix, and further to obtain the representative value of the covariance matrix and the corresponding feature vectors; finally, the feature vectors are arranged into a matrix by rows from top to bottom according to the corresponding representative values, and the first k rows are taken to form the matrix P, that is, the data which is reduced from five dimensions to k dimension(s) (k<5).

In practical applications, during the process of reducing dimensions for the initial image features of the to-be-processed image in the multiple dimensions of features, the amount of data calculation is relatively large, especially in the case that the number of to-be-processed images is relatively large or the images are relatively complex, the amount of calculation required for dimension reduction is greater and the processing time is longer; in order to improve the efficiency, a machine learning method is introduced into the process of dimension reduction, preferably, a dimension-reduction model of image features is used for the dimension reduction of the initial image features of the to-be-processed image in the multiple dimensions of features, specifically inputting the initial image features of the to-be-processed image in the multiple dimensions of features into the dimension-reduction model of image features for performing the dimension reduction, so as to output the image features of the to-be-processed image in the dimensions of sensitive data masking.

The process of reducing dimensions for the initial image features of the to-be-processed image in the multiple dimensions of features is based on the premise that the dimension-reduction model of image features has been built and obtained by training; in a preferred mode provided in the embodiments of this specification, the dimension-reduction model of image features is trained in following way: 1) Acquiring an initial image set including initial images on which sensitive data is masked; 2) Extracting, from the initial image set, the initial image features of the initial images of the initial image set in the multiple dimensions of features; 3) Reducing dimensions for the initial image features in the multiple dimensions of features, to obtain real image features of the initial images in the at least one dimension of sensitive data masking; and 4) Training, with first training samples including the initial image features in the multiple dimensions of the features and the real image features in the at least one dimension of sensitive data masking, a pre-built dimension-reduction model of the initial image features to obtain the dimension-reduction model of the image features.

For example, among the project members participating insurance projects, if 100 of the project members file claims over a certain time period, the generated materials of claim cases are all in the form of images, and every project member's materials of claim case contains 50 images, comprise: project member's front and back images of ID card, any photo of the project member A, and any image containing the project member A's bank account number and cell-phone number, and the like;

For the 50 images in every project member's materials of the claim case, the initial feature vectors are extracted from each image in the five dimensions (five-dimension vectors): dimension of image colors, dimension of image texture, dimension of image feature identifiers, dimension of image feature position and dimension of image feature spatial relationship;

In the process of training the dimension-reduction model of image features, a way of supervised training is used; therefore, the real feature vectors may be determined after the dimension reduction is performed for the initial feature vectors of each image, and specifically it is to perform a dimension-reduction calculation for each photo the five dimensions, to obtain the real feature vectors (one-dimension vectors) of the dimension of image colors (the dimension of sensitive data masking).

Finally, according to the corresponding relationship between the initial feature vectors (five-dimension vector) and the real feature vectors (one-dimension vectors) of each image, the initial feature vectors (five-dimension vectors) and the real feature vectors (one-dimension vectors) of each image are taken as a training sample, and the determined 5000 training samples are used to train the dimension-reduction model of initial image features which is built based on a convolutional neural network algorithm;

By that analogy, a large number of training samples are used to train the dimension reduction model of initial image features, to obtain the dimension-reduction model of image features used for the dimension reduction of feature vectors of the image.

In step S106, the method may include identifying sensitive features of the to-be-processed image based on the image features in the at least one dimension of sensitive data masking.

The sensitive features mentioned in the embodiments of this specification refer to the features of the to-be-processed image that contain private information of the project member or sensitive information not suitable for public display. By taking the project member's front image of ID card as an example, the image features of the area where the project member's head portrait is located, as well as the image features of the area where the project member's ID number, name, birth place are located are all sensitive features. Therefore, it is required to recognize the sensitive features in the area containing all the private information of the project member's front image of ID card.

In the above, during the process of reducing dimensions for the initial image features of the to-be-processed image in the multiple dimensions of features, a machine learning method is introduced to improve the processing efficiency of dimension reduction; similarly, the sensitive features recognition for the to-be-processed image also requires a large amount of calculation and a long processing time, and therefore, the machine learning method can be introduced as well to improve the efficiency of sensitive features recognition; preferably, an image recognition model is configured for the image features recognition of the to-be-processed image, inputting the to-be-processed image, which carries the image features in the at least one dimension of sensitive data masking, into the image recognition model, so as to output the sensitive features of the to-be-processed image.

The above process of using the image recognition model for the image features recognition of the to-be-processed image is based on the premise that the image recognition model has been built and obtained by training; in a preferred mode provided in the embodiments of this specification, during the training of the image recognition model, based on the preferred mode used in training of the image recognition model, the pre-built image recognition model is trained by taking the initial image having real image features in the at least one dimension of sensitive data masking and the initial image having the real sensitive features as a second training sample, to obtain the image recognition model for the sensitive features recognition of the to-be-processed image.

In the process of training the image recognition model, the same supervised training method is also adopted as the above example, and therefore, the first is to manually mark the real sensitive features of the 50 images contained in the materials of claim case for each of the project members, after marking, the next is to determine the real sensitive features contained in each of the images;

In the practical training, by use of the obtained real feature vectors (one-dimension vectors) of each image in the dimension of image color (dimension of sensitive data masking), the images (the real feature vectors (one-dimension vectors) carrying the dimension of image colors) which has not received sensitive features recognition or marking or the images of which real sensitive features has been marked are taken as a training sample according to the corresponding relationship between the images which has not received sensitive features recognition or marking and the images of which real sensitive features has been marked, finally the determined 5000 training samples are used to train the initial image recognition model which is built based on a convolutional neural network algorithm;

By that analogy, a large number of training samples are used to train the initial image recognition model, to obtain the image recognition model for recognition of the sensitive features of the to-be-processed image.

The training of the image recognition model can be independent of the training process of the dimension reduction model of image features in addition to being performed on the basis of the preferred mode used for the dimension reduction model of image features, for example, the image recognition model is trained in the following way: 1) Acquiring an initial image set including initial images on which sensitive data is masked; 2) Extracting, from the initial image set, initial image features of the initial images of the initial image set in the multiple dimensions of features; 3) Reducing dimensions for the initial image features in the multiple dimensions of features, to obtain real features of the initial images in the at least one dimension of sensitive data masking; and 4) Training a pre-built initial image recognition model with second training samples including the initial images having the real image features in the at least one dimension of sensitive data masking and the initial images having the real sensitive features to obtain the image recognition model for the sensitive features recognition of the to-be-processed image.

In Step S108, the method may include masking the sensitive data for the sensitive features of the to-be-processed image.

After the sensitive features in the to-be-processed image are recognized, sensitive data is masked to the sensitive features recognized in the to-be-processed image. This embodiment does not define the way for sensitive data masking of the sensitive features recognized in the to-be-processed image. Examples include adding watermarks for the sensitive features recognized in the to-be-processed image, or blurring the sensitive features recognized in the to-be-processed image, or cropping the area where the recognized sensitive features are located, from the to-be-processed image.

In what follows, the applying of the method for sensitive data masking based on image recognition of this specification to insurance projects is taken as an example, combined with FIG. 2, a further explanation for the method for sensitive data masking based on image recognition of this specification is given.

In Step S202, the method may include acquiring the to-be-processed images in materials of a project submitted by a project member during the project participation.

For project member A participating an insurance project, a claims case will be generated correspondingly after the project member A claims, the materials of claims case are in the form of images, including: project member A's front and back images of ID card, any photo of the project member A, and any image containing the project member A's bank account number and cell-phone number.

In Step S204, the method may include extracting feature vectors of the to-be-processed image in five feature dimensions.

The images in the above claim materials include the private information of the project member A, so sensitive data masking is required to be performed for these images; in the masking process, the feature vectors in the following five dimensions may be extracted for each image: dimension of image colors, dimension of image texture, dimension of image feature identifiers, dimension of image feature position and dimension of image feature spatial relationship.

Specifically, the representative value of the feature vectors in the dimension of image colors represents color features of the image, the representative value of the feature vectors in the dimension of image texture represents arrangement properties of partial areas that change slowly or periodically in the image, the representative value of the feature vectors in the dimension of image feature identifiers represents feature identifiers of feature blocks in the image, the representative value of the feature vectors in the dimension of image feature position represents the position information of feature blocks in the image, and the representative value of the feature vectors in the dimension of image feature spatial relationship represents a distance relationship, a hierarchy relationship or an overlap relationship among the feature blocks in the image.

In step S206, the method may include preprocessing the to-be-processed image based on the feature vectors of five feature dimensions.

By taking the above dimension of image feature position as an example, the image is preprocessed based on the dimension of image feature position. The first step is to determine position information of the image features in the image according to the feature vectors of the to-be-processed image; the second step is to crop the to-be-processed image based on the position information of the image features of the to-be-processed image, to reduce the amount of data processing during the subsequent sensitive features recognition for the to-be-processed image, and to improve the processing efficiency.

In step S208, the method may include performing a dimension-reduction calculation for the feature vectors of five feature dimensions, to obtain the feature vector of the to-be-processed image in the dimension of image color.

Specifically, a dimension-reduction calculation is performed for the image in the five dimensions (five-dimension vectors), to obtain the feature vectors of the image in the dimension of image feature position (one-dimension vectors).

In step S210, the method may include recognizing the sensitive features of the to-be-processed image based on the feature vectors in the dimension of image feature position.

By taking the project member's front image of ID card as an example, the image features of the area where the project member's head portrait locates, as well as the image features of the area where the project member's ID number, name, birth place locate are all sensitive features, and thus, it is required to recognize the sensitive features in the area containing all private information of the project member's front image of ID card.

In step S212, the method may include masking sensitive data for the sensitive features recognized in the to-be-processed image.

Specifically, the sensitive data is masked for the sensitive features recognized in the image through the way of blurring the sensitive features recognized in the to-be-processed image, or the way of cropping the area where the recognized sensitive features are located, from the image.

The method for sensitive data masking based on image recognition provided in the embodiments of this specification starts from the image recognition, the first is to extract the initial image features of a to-be-processed image, and on this basis the next is to reduce dimensions for the extracted initial image features of the to-be-processed image to reduce the amount of data processing during the sensitive data masking for the to-be-processed image and to improve the processing efficiency, then on the basis of dimension reduction, sensitive data is masked for the to-be-processed image based on the sensitive features recognized in the to-be-processed image, so as to realize sensitive data masking based on image recognition, and meanwhile the efficiency for sensitive data masking is relatively higher.

Embodiments of a device for sensitive data masking based on image recognition provided by this specification are as follows. In the above embodiments, a method for masking sensitive data based on image recognition is provided; correspondingly, this specification also provides a device for sensitive data masking based on image recognition, which is explained below in combination with the drawings.

Figure 3:
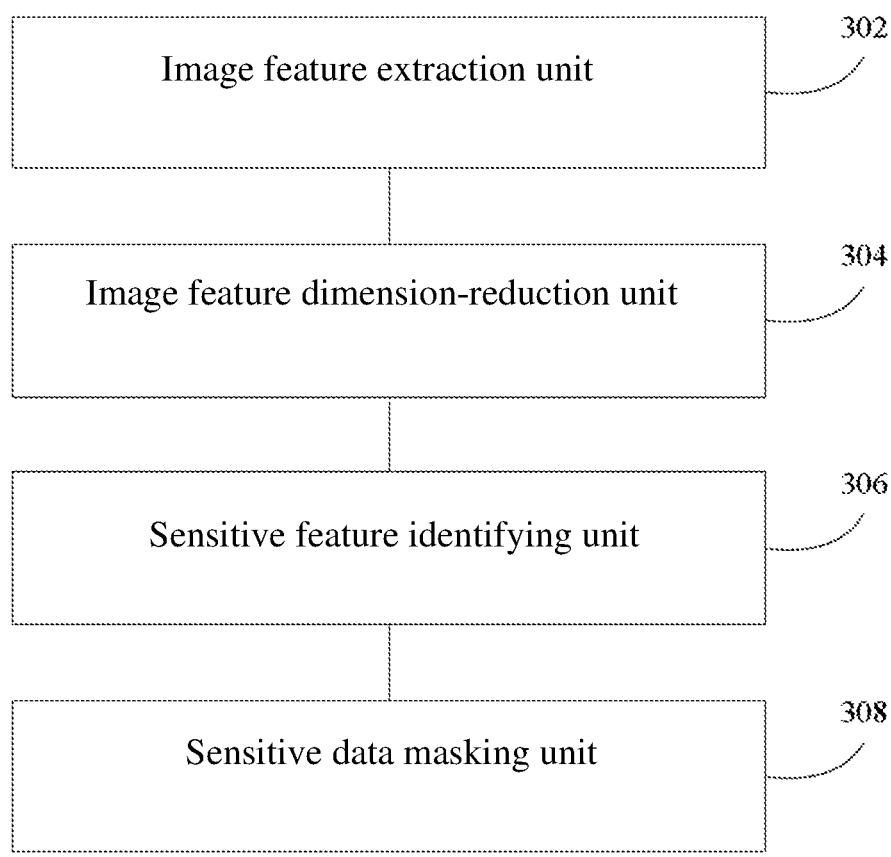
FIG. 3 is a schematic diagram for a device for masking sensitive data based on image recognition provided in embodiments of this specification.

Referring to FIG. 3, FIG. 3 shows a schematic diagram for the embodiments of a device for sensitive data masking based on image recognition provided in this specification.

Since the embodiments of the device are similar to the embodiments of the method, the description is relatively simple; for the relevant part, please refer to the corresponding description for the embodiments of the method provided above. The device embodiments described below are merely indicative.

The present specification provides a device for sensitive data masking based on image recognition, comprising: a processor; a memory, configured to store computer executable instructions, which, when executed, cause the processor to perform operations comprising: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking the sensitive features of the to-be-processed image.

In some embodiments, the dimension of sensitive data masking comprises at least one of the following items: a dimension of image color, a dimension of image feature position and a dimension of image feature identifier.

In some embodiments, the extracting initial image features of a to-be-processed image in multiple dimensions of features comprises: extracting feature vectors corresponding to the initial image features of the to-be-processed image in the multiple dimensions of features. A numerical value of vector dimensions of the feature vectors is equal to a numerical value of the multiple dimensions of features.

In some embodiments, the dimension-reduction unit of image features 304 is configured to perform a dimension-reduction calculation, to obtain the feature vectors of the to-be-processed image in the at least one dimension of sensitive data masking.

In some embodiments, the device for masking sensitive data based on image recognition comprises: a processor; a memory, configured to store computer executable instructions, which, when executed, cause the processor to perform operations comprising; extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; and masking the sensitive features of the to-be-processed image.

In some embodiments, the device for masking sensitive data based on image recognition comprises: a preprocessing unit, configured to reprocess the to-be-processed image based on the initial image features in the multiple dimensions of features.

In some embodiments, if the multiple dimensions of features include a dimension of image feature position, the preprocessing unit comprises: a position information determining subunit, configured to determine according to the initial image features in the dimension of image feature position, position information of the image features of the to-be-processed image; and a cropping subunit, configured to crop the to-be-processed image based on the position information of the image features of the to-be-processed image.

In some embodiments, the device for masking sensitive data based on image recognition comprises: an acquisition unit of to-be-processed images, configured to acquire the to-be-processed image included in materials of a project submitted by a project member during project participation.

In some embodiments, the dimension-reduction unit of image features 304 is realized based on a dimension-reduction model of image features obtained by training, and the processing of features dimension reduction is performed through the dimension-reduction model of image features trained by inputting, into the trained dimension-reduction model of image features, the initial image features of the to-be-processed image in the multiple dimensions of the features to perform features dimension reduction, and to output the image features of the to-be-processed image in the at least one dimension of sensitive data masking.

In some embodiments, the dimension-reduction model of image features is trained by running the following units: an image set acquisition unit, configured to acquire an initial image set including initial images on which sensitive data is masked; an image feature extraction unit, configured to extract, from the initial image set, initial image features of the initial image of the initial image set in the multiple dimensions of features; an image feature dimension-reduction processing unit, configured to reduce dimensions for the initial image features in the multiple dimensions of features, to obtain real image features of the initial images in the at least one dimension of sensitive data masking; a training unit for dimension-reduction model of image features, configured to train with first training samples including the initial image features in the multiple dimensions of the features and the real image features in the at least one dimension of sensitive data masking, a pre-built dimension-reduction model of the initial image features to obtain the dimension-reduction model of the image features. In some embodiments, the sensitive feature identifying unit 306 is realized based on an image recognition model obtained by training, and identifying of sensitive features is performed through the image recognition model trained by inputting, into the trained image recognition model, the to-be-processed image having the image features in the at least one dimension of sensitive data masking to identify the sensitive features, and to output the sensitive features of the to-be-processed image.

In some embodiments, the image recognition model is trained by running the following units: a training unit for image recognition model, configured to train a pre-built initial image recognition model with second training samples including the initial images having the real image features in the at least one dimension of sensitive data masking and the initial images having the real sensitive features to obtain the image recognition model.

Embodiments of a model training method provided in this specification are as follows: in the above embodiments, a method for masking sensitive data based on image recognition is provided; in addition, this specification also provides a model training method, which is explained below in combination with the drawings.

Figure 4:
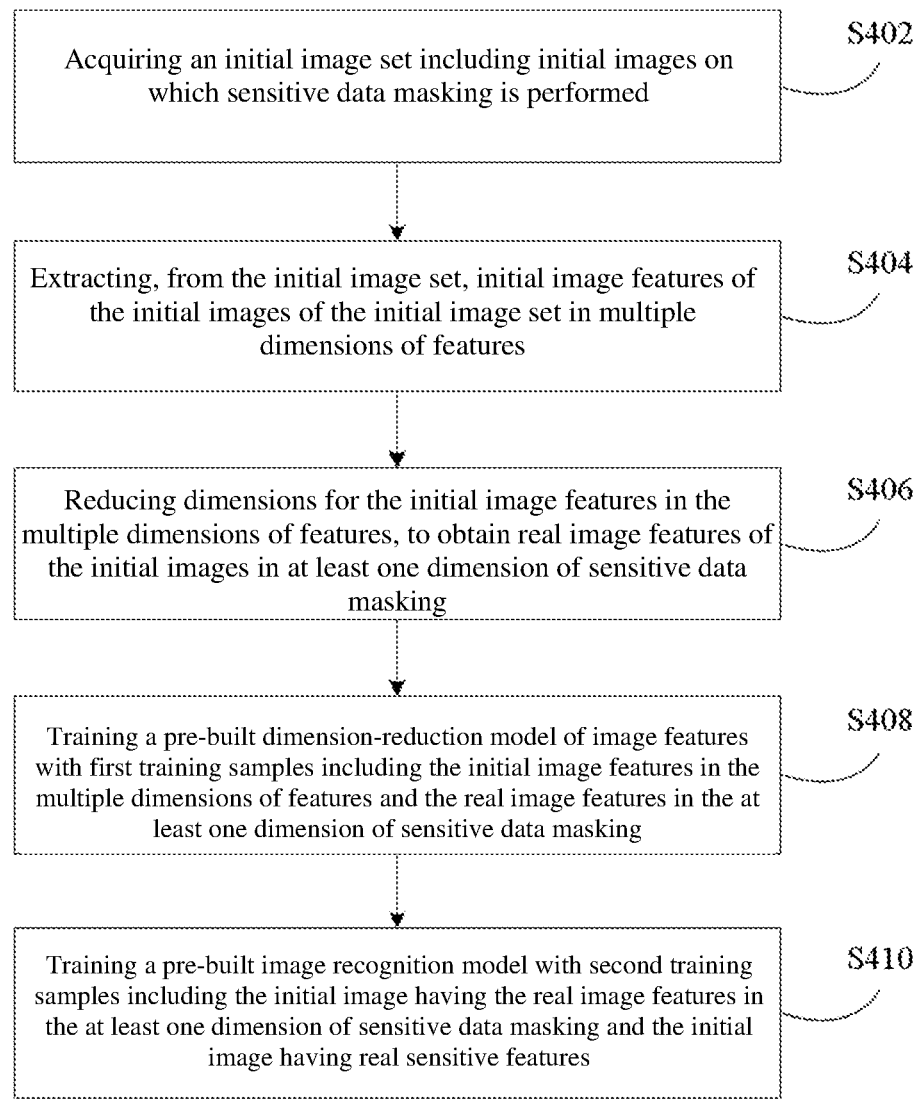
FIG. 4 is a processing flow chart for a model training method provided in embodiments of this specification.

Referring to FIG. 4, FIG. 4 shows a flow chart for a model training method provided in this specification. The description of this embodiments may be referred to the corresponding description for the embodiments of the method provided above. This specification provides a model training method, including the following steps.

In step S402, the method may include acquiring an initial image set including initial images on which sensitive data is masked.

In step S404, the method may include extracting, from the initial image set, initial image features of the initial images of the initial image set in multiple dimensions of features.

In step S406, the method may include reducing dimensions for the initial image features in the multiple dimensions of features, to obtain real image features of the initial images in at least one dimension of sensitive data masking.

In step S408, the method may include training a pre-built dimension-reduction model of image features with first training samples including the initial image features in the multiple dimensions of features and the real image features in the at least one dimension of sensitive data masking.

In step S410, the method may include training a pre-built image recognition model with second training samples including the initial image having the real image features in the at least one dimension of sensitive data masking and the initial image having real sensitive features.

Embodiments of a model training device provided in this specification are as follows. In the above embodiments, a model training method is provided; correspondingly, this specification also provides a model training device, which is explained below in combination with the drawings.

Figure 5:
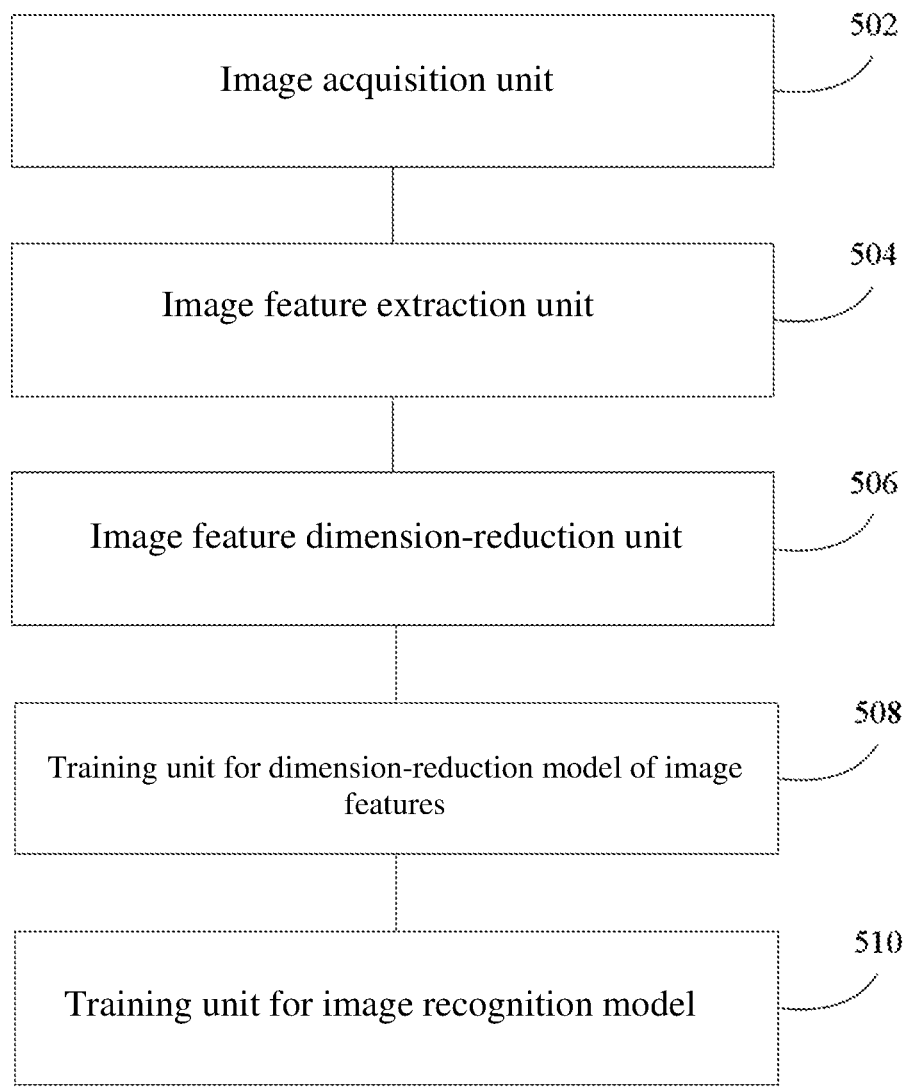
FIG. 5 is a schematic diagram for a model training device provided in embodiments of this specification.

Referring to FIG. 5, FIG. 5 shows a schematic diagram for the embodiments of a model training device provided in this specification. The relevant part of this embodiments may be referred to the corresponding description for the embodiments of the method provided above. This specification provides a model training device, comprising: an image acquisition unit 502, configured to acquire an initial image set including initial images on which sensitive data masking is masked, an image features extraction unit 504, configured to extract, from the initial image set, initial image features of the initial images of the initial image set in multiple dimensions of features, a dimension-reduction unit of image features 506, configured to reduce dimensions for the initial image features in the multiple dimensions of features, to obtain real image features of the initial images in at least one dimension of sensitive data masking; a training unit for dimension-reduction model of image features 508, configured to train a pre-built dimension-reduction model of image features with first training samples including the initial image features in the multiple dimensions of features and the real image features in the at least one dimension of sensitive data masking, and a training unit for image recognition model 510, configured to training a pre-built image recognition model with second training samples including the initial image having the real image features in the at least one dimension of sensitive data masking and the initial image having real sensitive features.

Figure 6:
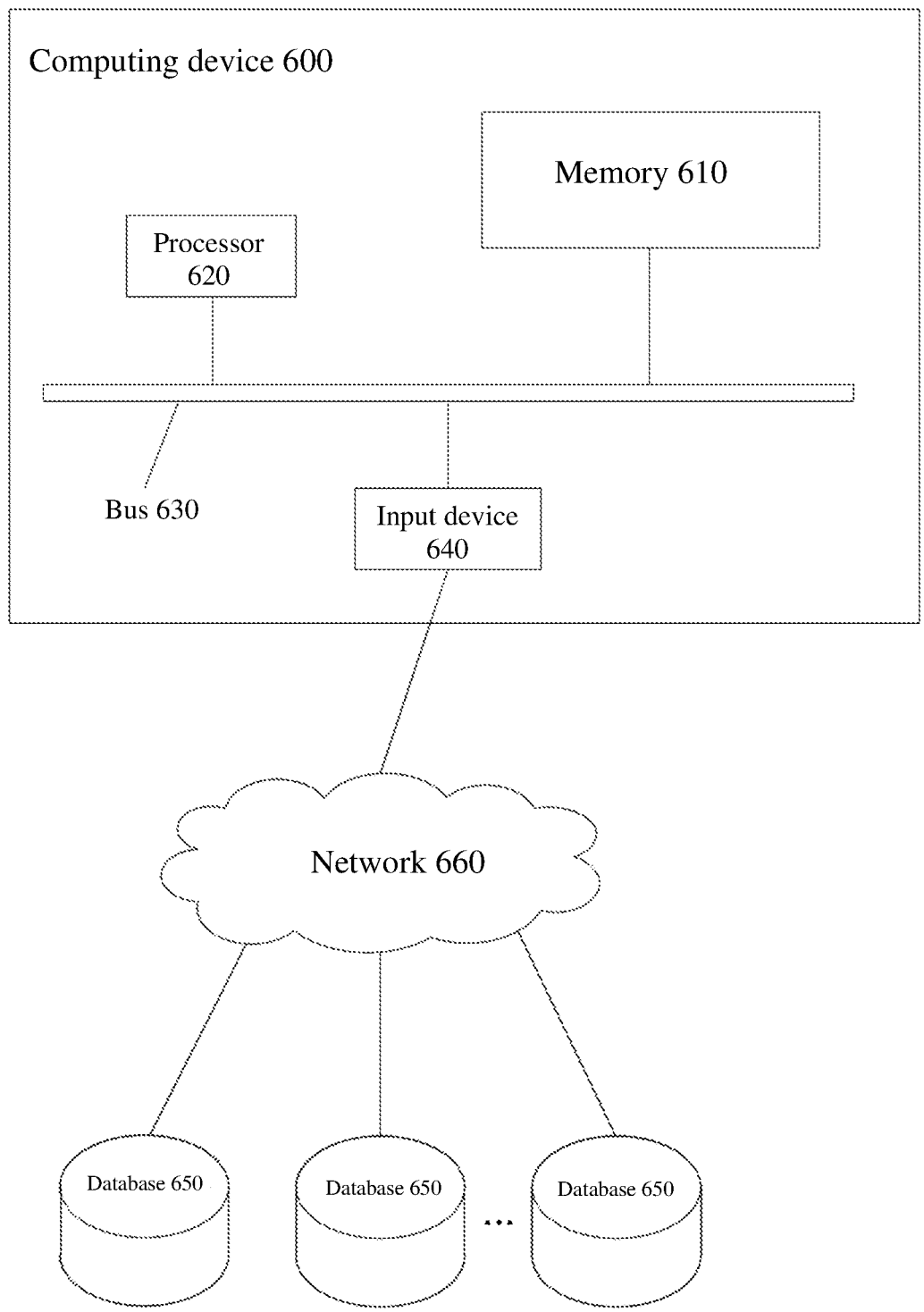
FIG. 6 is a block diagram for a computing device provided in embodiments of this specification.

Referring to FIG. 6, FIG. 6 shows a block diagram for a computing device 400 according to one embodiment of this specification. Components of the computing device 600 include but are not limited to a memory 610 and a processor 620. The processor 620 is connected with the memory 610 via the bus 630, and the database 650 is used for storing data.

The computing device 600 also comprises an access device 640, which enables the computing device 600 to communicate via one or more networks 660. Examples of these networks comprise Public Switched Telephone Network (PSTN), Local Area Network (LAN), Wide Area Network (WAN), Personal Area Network (PAN) or combination of communication networks such as the Internet. The access device 640 may include one or more of all types of wired or wireless network interfaces (such as Network Interface Card (NIC)), such as IEEE802.11 Wireless Local Area Network (WLAN) wireless interfaces, World Interoperability for Microwave Access (Wi-MAX) interfaces, Ethernet interfaces, Universal Serial Bus (USB) interfaces, cellular network interfaces, Bluetooth interfaces, Near Field Communication (NFC) interfaces, and so on.

In an embodiment of this specification, the above-mentioned components of the computing device 600 and other components not shown in FIG. 6 may also be connected to each other, for example through a bus. The block diagram of the computing device shown in FIG. 6 is for example purposes only and is not a limitation of the scope of this specification. The technical personnel in the field may add or replace with other components as required.

The computing device 600 can be any type of stationary or mobile computing device, comprising mobile computer or mobile computing device (such as: tablet computers, personal digital assistants, laptop computers, notebook computers, notebooks), mobile phones (e.g., smart phones), wearable computing devices (e.g., smart watches, intelligent glasses, and the like) or other types of mobile devices, or stationary computing devices, such as desktop computers or PC. The computing device 600 can also be a mobile or stationary server.

This specification provides a computing device, comprising a memory 610, a processor 620 and computer instructions stored on the memory and capable of running on the processor, the processor 620 is configured for executing the following computer executable instructions: extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; masking the sensitive data for the sensitive features of the to-be-processed image.

In some embodiments, the dimension of sensitive data masking comprises at least one of the following items: a dimension of image color, a dimension of image feature position and a dimension of image feature identifier.

In some embodiments, the extracting the initial image features of a to-be-processed image in the multiple dimensions of features comprises: extracting feature vectors corresponding to the initial image features of the to-be-processed image in the multiple dimensions of features; and a numerical value of vector dimensions of the feature vectors is equal to a numerical value of the multiple dimensions of features.

In some embodiments, the reducing dimensions for the initial image features in the multiple dimensions of features to obtain image features of the to-be-processed image in at least one dimension of sensitive data masking comprises: performing a dimension-reduction calculation to obtain the feature vectors of the to-be-processed image in the at least one dimension of sensitive data masking.

In some embodiments, the processor 620, after the extracting initial image features of a to-be-processed image in multiple dimensions of features is executed, and before the reducing dimensions for the initial image features in the multiple dimensions of features to obtain image features of the to-be-processed image in at least one dimension of sensitive data masking is executed, is also used for executing the following computer executable instructions: preprocessing the to-be-processed image based on the initial image features in the multiple dimensions of features.

In some embodiments, if the multiple dimensions of features include a dimension of image feature position, the preprocessing the to-be-processed image based on the initial image features in the multiple dimensions of features comprises: determining, according to the initial image features in the dimension of image feature position, position information of the image features of the to-be-processed image; cropping the to-be-processed image based on the position information of the image features of the to-be-processed image.

In some embodiments, before the extracting initial image features of a to-be-processed image in multiple dimensions of features is executed, the processor 620 is also configured for executing the following computer executable instructions: acquiring the to-be-processed image included in materials of a project submitted by a project member during project participation.

In some embodiments, the reducing dimensions for the initial image features in multiple dimensions of features to obtain the features of the to-be-processed image in at least one dimension of sensitive data masking is realized based on a dimension-reduction model of image features obtained by training, and the processing of features dimension reduction is performed through the dimension-reduction model of image features trained by inputting, into the trained dimension-reduction model of image features, the initial image features of the to-be-processed image in the multiple dimensions of features to perform features dimension reduction, and to output the image features of the to-be-processed image in the at least one dimension of sensitive data masking.

In some embodiments, the dimension-reduction model of image features is trained in following way: acquiring an initial image set including initial images on which sensitive data is masked; extracting, from the initial image set, initial image features of the initial images of the initial image set in the multiple dimensions of features; reducing dimensions for the initial image features in the multiple dimensions of features, to obtain real image features of the initial images in the at least one dimension of sensitive data masking; training, with first training samples including the initial image features in the multiple dimensions of the features and the real image features in the at least one dimension of sensitive data masking, a pre-built dimension-reduction model of the initial image features to obtain the dimension-reduction model of the image features.

In some embodiments, the identifying sensitive features of the to-be-processed image based on the image features in the at least one dimension of sensitive data masking comprises: an image recognition model obtained by training, and identifying of sensitive features is performed through the image recognition model trained by inputting, into the trained image recognition model, the to-be-processed image having the image features in the at least one dimension of sensitive data masking to identify the sensitive features, and to output the sensitive features of the to-be-processed image.

Figure 7:
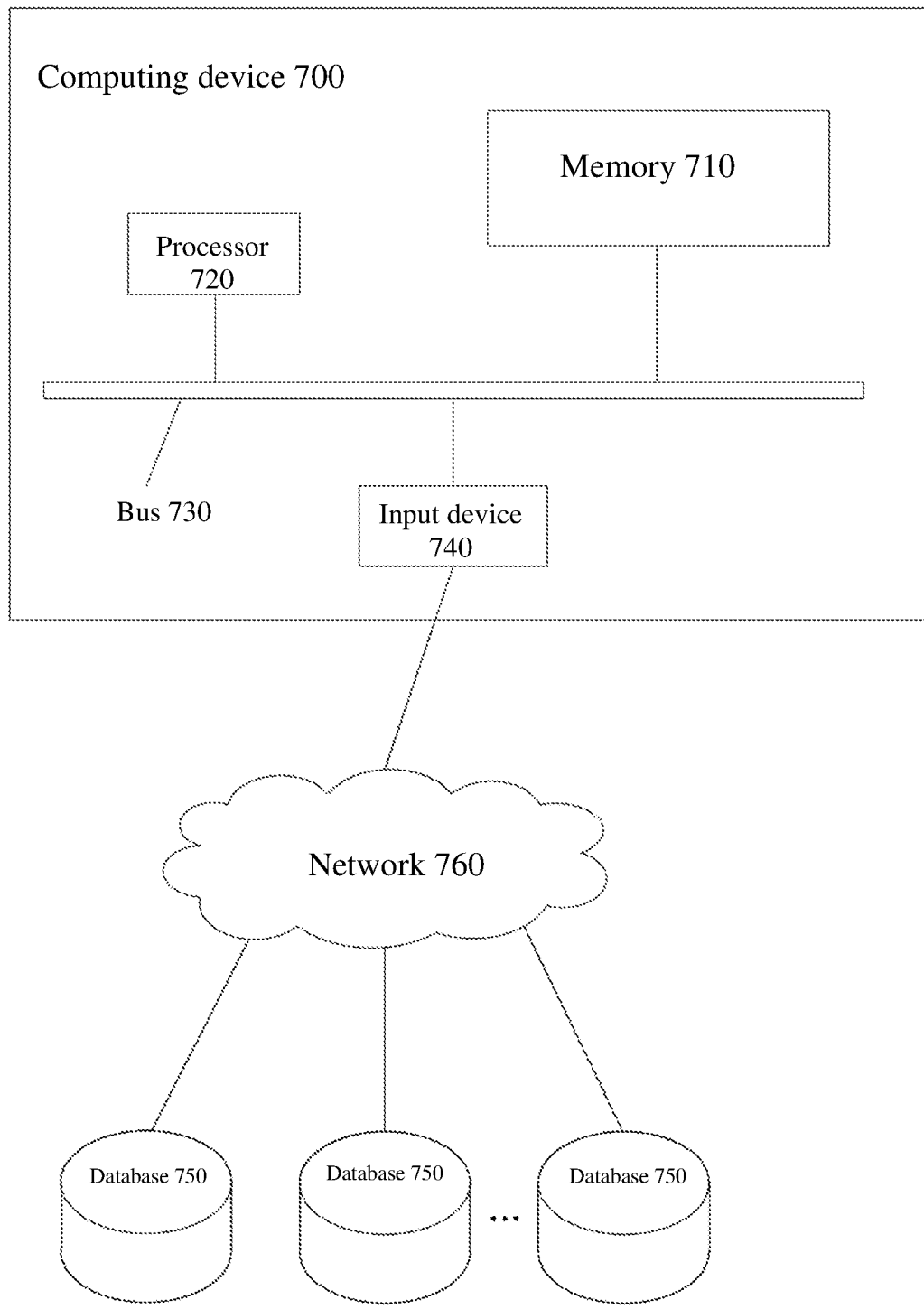
FIG. 7 is a block diagram for another computing device provided in embodiments of this specification.

In some embodiments, the image recognition model of image features is trained in following way: training a pre-built initial image recognition model with second training samples including the initial images having the real image features in the at least one dimension of sensitive data masking and the initial images having the real sensitive features FIG. 7 shows a block diagram for a computing device 400 according to one embodiment of this specification. Components of the computing device 700 include but are not limited to a memory 710 and a processor 720. The processor 720 is connected with the memory 710 via the bus 730, and the database 750 is used for storing data.

The computing device 700 also comprises an access device 740, which enables the computing device 700 to communicate via one or more networks 760. Examples of these networks comprise Public Switched Telephone Network (PSTN), Local Area Network (LAN), Wide Area Network (WAN), Personal Area Network (PAN) or combination of communication networks such as the Internet. The access device 740 may include one or more of all types of wired or wireless network interfaces (such as Network Interface Card (NIC)), such as IEEE802.11 Wireless Local Area Network (WLAN) wireless interfaces, World Interoperability for Microwave Access (Wi-MAX) interfaces, Ethernet interfaces, Universal Serial Bus (USB) interfaces, cellular network interfaces, Bluetooth interfaces, Near Field Communication (NFC) interfaces, and so on.

In an embodiment of this specification, the above-mentioned components of the computing device 700 and other components not shown in FIG. 7 may also be connected to each other, for example through a bus. The block diagram of the computing device shown in FIG. 7 is for example purposes only and is not a limitation of the scope of this specification. The technical personnel in the field may add or replace with other components as required.

The computing device 700 can be any type of stationary or mobile computing device, comprising mobile computer or mobile computing device (such as: tablet computers, personal digital assistants, laptop computers, notebook computers, notebooks), mobile phones (e.g., smart phones), wearable computing devices (e.g., smart watches, intelligent glasses, and the like) or other types of mobile devices, or stationary computing devices, such as desktop computers or PC. The computing device 700 can also be a mobile or stationary server.

This specification provides a computing device, comprising a memory 710, a processor 720 and computer instructions stored on the memory and capable of running on the processor, the processor 720 is used for executing the following computer executable instructions: acquiring an initial image set including initial images on which sensitive data is masked; extracting, from the initial image set, initial image features of the initial images of the initial image set in multiple dimensions of features; reducing dimensions for the initial image features in the multiple dimensions of features, to obtain real image features of the initial images in at least one dimension of sensitive data masking; training a pre-built dimension-reduction model of image features with first training samples including the initial image features in the multiple dimensions of features and the real image features in the at least one dimension of sensitive data masking; training a pre-built image recognition model with second training samples including the initial image having the real image features in the at least one dimension of sensitive data masking and the initial image having real sensitive features.

This specification also provides a computer readable storage media. One embodiment of this specification also provides a computer readable storage media for storing computer instructions, the instructions, when executed by the processor, are configured for: Extracting initial image features of a to-be-processed image in multiple dimensions of features; reducing dimensions for the initial image features in the multiple dimensions of features, to obtain image features of the to-be-processed image in at least one dimension of sensitive data masking; identifying sensitive features of the to-be-processed image based on the image features in the at least one dimension of sensitive data masking; masking the sensitive data for the sensitive features of the to-be-processed image.

In some embodiments, the dimension of sensitive data masking comprises at least one of the following items: a dimension of image color, a dimension of image feature position and a dimension of image feature identifier.

In some embodiments, the extracting the initial image features of a to-be-processed image in multiple dimensions of features comprises: extracting feature vectors corresponding to the initial image features of the to-be-processed image in the multiple dimensions of features.

In some embodiments, the reducing dimensions for the initial image features in the multiple dimensions of features to obtain image features of the to-be-processed image in at least one dimension of sensitive data masking comprises: performing a dimension-reduction calculation to obtain the feature vectors of the to-be-processed image in the at least one dimension of sensitive data masking.

In some embodiments, the method, after the extracting initial image features of a to-be-processed image in multiple dimensions of features, and before the reducing dimensions for the initial image features in the multiple dimensions of features to obtain image features of the to-be-processed image in at least one dimension of sensitive data masking, further comprises: preprocessing the to-be-processed image based on the initial image features in the multiple dimensions of features.

In some embodiments, if the multiple dimensions of features include a dimension of image feature position, the preprocessing the to-be-processed image based on the initial image features in the multiple dimensions of features comprises: determining, according to the initial image features in the dimension of image feature position, position information of the image features of the to-be-processed image; cropping the to-be-processed image based on the position information of the image features of the to-be-processed image.

In some embodiments, the method, before the extracting initial image features of a to-be-processed image in multiple dimensions of features, further comprises: acquiring the to-be-processed image included in materials of a project submitted by a project member during project participation.

In some embodiments, the reducing dimensions for the initial image features in the multiple dimensions of features to obtain image features of the to-be-processed image in at least one dimension of sensitive data masking is realized based on a dimension-reduction model of image features obtained by training, and the processing of features dimension reduction is performed through the dimension-reduction model of image features trained by inputting, into the trained dimension-reduction model of image features, the initial image features of the to-be-processed image in the multiple dimensions of features to perform features dimension reduction, and to output the image features of the to-be-processed image in the at least one dimension of sensitive data masking.

In some embodiments, the dimension-reduction model of image features is trained in following way: acquiring an initial image set including initial images on which sensitive data is masked; extracting, from the initial image set, initial image features of the initial images of the initial image set in the multiple dimensions of features; reducing dimensions for the initial image features in the multiple dimensions of features, to obtain real image features of the initial images in the at least one dimension of sensitive data masking; training, with first training samples including the initial image features in the multiple dimensions of the features and the real image features in the at least one dimension of sensitive data masking, a pre-built dimension-reduction model of the initial image features to obtain the dimension-reduction model of the image features.

In some embodiments, the identifying sensitive features of the to-be-processed image based on the image features in the at least one dimension of sensitive data masking is realized based on an image recognition model obtained by training, and identifying of sensitive features is performed through the image recognition model trained by inputting, into the trained image recognition model, the to-be-processed image having the image features in the at least one dimension of sensitive data masking to identify the sensitive features, and to output the sensitive features of the to-be-processed image.

In some embodiments, the image recognition model of image features is trained in following way: training a pre-built initial image recognition model with second training samples including the initial images having the real image features in the at least one dimension of sensitive data masking and the initial images having the real sensitive features One embodiment of this specification also provides a computer readable storage media for storing computer instructions, the instructions, when executed by the processor, are configured for: acquiring an initial image set including initial images on which sensitive data is masked; extracting, from the initial image set, initial image features of the initial images of the initial image set in multiple dimensions of features; reducing dimensions for the initial image features in the multiple dimensions of features, to obtain real image features of the initial images in at least one dimension of sensitive data masking; training a pre-built dimension-reduction model of image features with first training samples including the initial image features in the multiple dimensions of features and the real image features in the at least one dimension of sensitive data masking; training a pre-built image recognition model with second training samples including the initial image having the real image features in the at least one dimension of sensitive data masking and the initial image having real sensitive features.

The above is a schematic scheme for a computer readable storage media for this embodiment. The technical scheme of the storage media has the same conception as the technical scheme of the above method for masking sensitive data based on image recognition; for the details not described in detail in the technical scheme of the storage media, please refer to the description for the technical scheme of the above method for masking sensitive data based on image recognition.

The computer instructions include the computer program codes, which may be in source code form, object code form, executable file form or some intermediate forms, etc. The computer readable media may include: any entity or device capable of carrying the computer program codes, recording media, USB flash disk, mobile hard disk, disk, CD, computer memory, read-only memory (ROM), random access memory (RAM), electrical carrier signal, telecommunication signal and software distribution media, and so on. The content contained in the computer readable media may be appropriately augmented or subtracted as required by legislation and patent practice in a jurisdiction, for example in some jurisdictions, the computer readable media does not include electrical carrier signal and telecommunication signal.

The foregoing embodiments of the method are expressed as a series of combinations of actions for the sake of simplicity, but the technical personnel in this field may be aware that this specification is not limited by the sequence of actions described, since certain steps may be performed in other sequences or simultaneously in accordance with this specification. Secondly, technical personnel in this field may also be aware that the embodiments described in the specification all belong to preferred embodiments, and the actions and modules involved are not always necessary for this specification.

In the above embodiments, the description of each embodiment has its own emphasis; for the part not detailed in a certain embodiment, please refer to the relevant description of other embodiments.

The above disclosed preferred embodiments of this specification are intended only to assist in the description of this specification. The optional embodiments do not elaborate on all the details nor do they limit the invention to the specific embodiments described. Obviously, there are many modifications and changes that can be made according to the contents of this specification. These embodiments are selected and specifically described in this specification in order to better explain the principle and real application of this specification, so that technical personnel in this technical field can well understand and use this specification. This specification is subject only to the claims and its full scope and equivalents.

What is claimed is:

1. A method for masking sensitive data based on image recognition, comprising:
    extracting initial image features of a to-be-processed image in multiple dimensions of features by extracting feature vectors corresponding to the initial image features of the to-be-processed image in the multiple dimensions of features, wherein a numerical value of vector dimensions of the feature vectors is equal to a numerical value of the multiple dimensions of features;
    reducing dimensions for the initial image features in the multiple dimensions of features to obtain image features of the to-be-processed image in at least one dimension of sensitive data masking by performing a dimension-reduction calculation to obtain the feature vectors of the to-be-processed image in the at least one dimension of sensitive data masking;
    identifying sensitive features of the to-be-processed image based on the image features in the at least one dimension of sensitive data masking; and
        masking the sensitive features of the to-be-processed image.

2. The method for masking sensitive data based on image recognition according to claim 1, wherein the at least one dimension of sensitive data masking comprises at least one of a dimension of image color, a dimension of image feature position, and a dimension of image feature identifier.

3. The method for masking sensitive data based on image recognition according to claim 1, wherein the method, after the extracting initial image features of a to-be-processed image in multiple dimensions of features, and before the reducing dimensions for the initial image features in the multiple dimensions of features to obtain image features of the to-be-processed image in at least one dimension of sensitive data masking, further comprises:
    preprocessing the to-be-processed image based on the initial image features in the multiple dimensions of features.

4. The method for masking sensitive data based on image recognition according to claim 3, wherein, if the multiple dimensions of features include a dimension of image feature position, the preprocessing the to-be-processed image based on the initial image features in the multiple dimensions of features comprises:
    determining, according to the initial image features in the dimension of image feature position, position information of the image features of the to-be-processed image; and
    cropping the to-be-processed image based on the position information of the image features of the to-be-processed image.

5. The method for masking sensitive data based on image recognition according to claim 1, wherein the method, before the extracting initial image features of a to-be-processed image in multiple dimensions of features, further comprises:
    acquiring the to-be-processed image included in materials of a project submitted by a project member during project participation.

6. The method for masking sensitive data based on image recognition according to claim 1, wherein the reducing dimensions for the initial image features in the multiple dimensions of features to obtain image features of the to-be-processed image in at least one dimension of sensitive data masking comprises:
    obtaining, by training, a dimension-reduction model of image features, and
    inputting, into the trained dimension-reduction model of image features, the initial image features of the to-be-processed image in the multiple dimensions of the features to perform features dimension reduction, and to output the image features of the to-be-processed image in the at least one dimension of sensitive data masking.

7. The method for masking sensitive data based on image recognition according to claim 6, wherein the obtaining, by training, a dimension-reduction model of image features comprises:
    acquiring an initial image set including initial images on which sensitive data is masked;
    extracting, from the initial image set, initial image features of the initial images of the initial image set in the multiple dimensions of features;
    reducing dimensions for the initial image features in the multiple dimensions of features, to obtain real image features of the initial images in the at least one dimension of sensitive data masking; and
    training, with first training samples including the initial image features in the multiple dimensions of the features and the real image features in the at least one dimension of sensitive data masking, a pre-built dimension-reduction model of the initial image features to obtain the dimension-reduction model of the image features.

8. The method for masking sensitive data based on image recognition according to claim 7, wherein the identifying sensitive features of the to-be-processed image based on the image features in the at least one dimension of sensitive data masking comprises:
obtaining, by training, an image recognition model, and inputting, into the trained image recognition model, the to-be-processed image having the image features in the at least one dimension of sensitive data masking to identify the sensitive features, and to output the sensitive features of the to-be-processed image.

9. The method for masking sensitive data based on image recognition according to claim 8, wherein the obtaining, by training, an image recognition model comprises:
training a pre-built initial image recognition model with second training samples including the initial images having the real image features in the at least one dimension of sensitive data masking and the initial images having the real sensitive features to obtain the image recognition model.

10. A computing device, comprising:
one or more processors; and
a memory storing instructions executable by the one or more processors to causes the computing device to perform operations comprising:
extracting initial image features of a to-be-processed image in multiple dimensions of features by extracting feature vectors corresponding to the initial image features of the to-be-processed image in the multiple dimensions of features, wherein a numerical value of vector dimensions of the feature vectors is equal to a numerical value of the multiple dimensions of features;
reducing dimensions for the initial image features in the multiple dimensions of features to obtain image features of the to-be-processed image in at least one dimension of sensitive data masking by performing a dimension-reduction calculation to obtain the feature vectors of the to-be-processed image in the at least one dimension of sensitive data masking;
identifying sensitive features of the to-be-processed image based on the image features in the at least one dimension of sensitive data masking; and
masking the sensitive features of the to-be-processed image.

11. The computing device according to claim 10, wherein the operations further comprise:
acquiring an initial image set including initial images on which sensitive data is masked;
extracting, from the initial image set, initial image features of the initial images of the initial image set in the multiple dimensions of features;
reducing dimensions for the initial image features in the multiple dimensions of features, to obtain real image features of the initial images in at least one dimension of sensitive data masking;
training, with first training samples including the initial image features in the multiple dimensions of features and the real image features in the at least one dimension of sensitive data masking, a pre-built dimension-reduction model of image features to obtain the dimension-reduction model of the image features;
training a pre-built image recognition model with second training sample including the initial images having the real image features in the at least one dimension of sensitive data masking and the initial images having real sensitive features.

12. The computing device according to claim 10, wherein the at least one dimension of sensitive data masking comprises at least one of a dimension of image color, a dimension of image feature position, and a dimension of image feature identifier.

13. A non-transitory computer-readable storage medium configured with instructions executable by one or more processors to cause the one or more processors to perform operations comprising:
extracting initial image features of a to-be-processed image in multiple dimensions of features by extracting feature vectors corresponding to the initial image features of the to-be-processed image in the multiple dimensions of features, wherein a numerical value of vector dimensions of the feature vectors is equal to a numerical value of the multiple dimensions of features;
reducing dimensions for the initial image features in the multiple dimensions of features to obtain image features of the to-be-processed image in at least one dimension of sensitive data masking by performing a dimension-reduction calculation to obtain the feature vectors of the to-be-processed image in the at least one dimension of sensitive data masking;
identifying sensitive features of the to-be-processed image based on the image features in the at least one dimension of sensitive data masking; and
masking for the sensitive features of the to-be-processed image.

14. The non-transitory computer-readable storage medium according to claim 13, wherein the operations further comprise:
acquiring an initial image set including initial images corresponding to images on which sensitive data is masked;
extracting, from the initial image set, initial image features of the initial images in the multiple dimensions of features;
reducing dimensions for the initial image features in the multiple dimensions of features, to obtain real image features of the initial images in at least one dimension of sensitive data masking;
training, with first training samples including the initial image features in the multiple dimensions of features and the real image features in the at least one dimension of sensitive data masking, a pre-built dimension-reduction model of image features to obtain the dimension-reduction model of the image features;
train a pre-built image recognition model with second training sample including the initial images having the real image features in the at least one dimension of sensitive data masking and the initial images having real sensitive features.

15. The non-transitory computer-readable storage medium according to claim 13, wherein
the extracting initial image features of a to-be-processed image in multiple dimensions of features comprises:
extracting feature vectors corresponding to the initial image features of the to-be-processed image in the multiple dimensions of features; and
a numerical value of vector dimensions of the feature vectors is equal to a numerical value of the multiple dimensions of features.

16. The computing device according to claim 15, wherein the reducing dimensions for the initial image features in the multiple dimensions of features to obtain image features of the to-be-processed image in at least one dimension of sensitive data masking comprises: performing a dimension-reduction calculation to obtain the feature vectors of the to-be-processed image in the at least one dimension of sensitive data masking.

17. A non-transitory computer-readable storage medium configured with instructions executable by one or more processors to cause the one or more processors to perform operations comprising:
   extracting initial image features of a to-be-processed image in multiple dimensions of features, wherein the multiple dimensions of features include a dimension of image feature position;
   preprocessing the to-be-processed image based on the initial image features in the multiple dimensions of features by:
      determining, according to the initial image features in the dimension of image feature position, position information of the image features of the to-be-processed image; and
      cropping the to-be-processed image based on the position information of the image features of the to-be-processed image;
   reducing dimensions for the initial image features in the multiple dimensions of features to obtain image features of the to-be-processed image in at least one dimension of sensitive data masking;
   identifying sensitive features of the to-be-processed image based on the image features in the at least one dimension of sensitive data masking; and
   masking the sensitive features of the to-be-processed image.

18. A non-transitory computer-readable storage medium configured with instructions executable by one or more processors to cause the one or more processors to perform operations comprising:
   extracting initial image features of a to-be-processed image in multiple dimensions of features;
   reducing dimensions for the initial image features in the multiple dimensions of features to obtain image features of the to-be-processed image in at least one dimension of sensitive data masking by:
      obtaining, by training, a dimension-reduction model of image features, and
      inputting, into the trained dimension-reduction model of image features, the initial image features of the to-be-processed image in the multiple dimensions of the features to perform features dimension reduction, and to output the image features of the to-be-processed image in the at least one dimension of sensitive data masking;
   identifying sensitive features of the to-be-processed image based on the image features in the at least one dimension of sensitive data masking; and
   masking the sensitive features of the to-be-processed image, wherein the obtaining, by training, a dimension-reduction model of image features comprises:
      acquiring an initial image set including initial images on which sensitive data is masked,
      extracting, from the initial image set, initial image features of the initial images of the initial image set in the multiple dimensions of features,
         reducing dimensions for the initial image features in the multiple dimensions of features, to obtain real image features of the initial images in the at least one dimension of sensitive data masking, and
      training, with first training samples including the initial image features in the multiple dimensions of the features and the real image features in the at least one dimension of sensitive data masking, a pre-built dimension-reduction model of the initial image features to obtain the dimension-reduction model of the image features.

* * * * *